S. Green,
Fish Spawn Hatcher.
Nº 68,871. Patented Sep. 17, 1867.
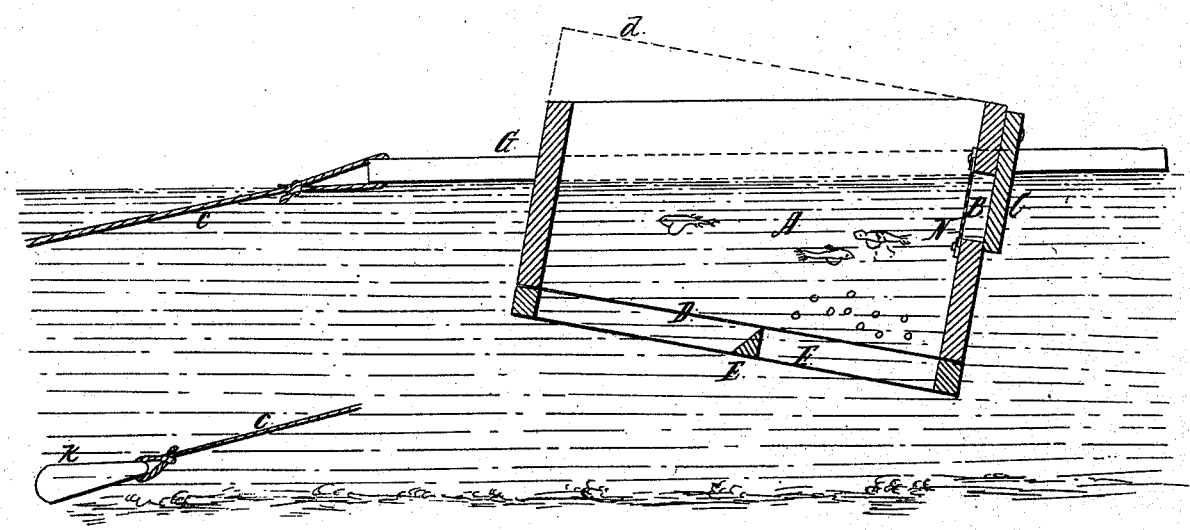
Witnesses:
Wm. S. Loughborough
Fred. A. Hatch
Inventor:
Seth Green

United States Patent Office.

SETH GREEN, OF ROCHESTER, NEW YORK.

Letters Patent No. 68,871, dated September 17, 1867.

---

DEVICE FOR HATCHING THE SPAWN OF FISHES.

---

The Schedule referred to in these Letters Patent and making part of the same.

---

TO ALL WHOM IT MAY CONCERN:

Be it known that I, SETH GREEN, of Rochester, in the county of Monroe, and State of New York, have invented a new and useful "Method of Hatching Fish-Spawn;" and I do hereby declare that the following is a full, clear, and exact description thereof, reference being had to the accompanying drawing, making part of this specification, in which the figure is a vertical central section of my invention, represented as applied in the water.

This invention relates more especially to the propagation of shad, and its nature consists in the peculiar construction and arrangement of a propagating or fish or frog-spawn hatching-chamber in such a manner as to effect a perfect and uniform circulation throughout the entire chamber, and at the same time prevent the escape of the spawn, and also of the young fish, until the attendant thinks proper.

To enable others to make and use my invention, I will describe its construction and operation.

I provide a rectangular box, A, of any desired size or proportion. I prefer them, however, about two feet long by eighteen inches wide and ten or twelve inches deep. I provide a suitable square opening in one end, as shown at B. This opening is covered upon the inside of the chamber with a fine wire screen, about No. 12, and upon the outside is hung a cap, C, which may be pivoted above, as shown, and made to swing down over the opening, or it may be made to slide over it horizontally. I also provide the open bottom with a similar wire screen, D, but of finer mesh. I attach a shallow frame, F, to the lower edge of the chamber or case A, outside of the screen. There may be one or more cross-bars, E, but they should be made thin on the upper side, as shown, to prevent the lodgment of any of the spawn upon them, as the spawn will only hatch well when buoyed up in the water, by a perfect circulation. I attach a float-bar, G, obliquely across each side of the case or chamber A, and to one end of these, I attach a suitable anchoring-cord, c. They are connected together a few feet from the bars, and continued in one cord to the anchor $k$. The chambers may be cut down, as shown, or they may be left full, as indicated by the dotted lines $d$. The floats F may be very much lengthened, if desired, and a series of cases attached to them, or there may be a long case made and provided with suitable divisions and anchored across the stream, from each end, but I prefer to have the cases made separate, and in size and proportion about as first described. They should be arranged more or less obliquely upon the floats F, according to the rapidity with which the current runs in which they are to be anchored. The obliquity shown in the drawing I find well adapted to a current running about two miles per hour, for shad, which affords a perfect circulation, just sufficient to keep the shad-spawn perfectly buoyed in the water, and all exposed to a gentle agitation. In a faster stream or current the case should be arranged flatter upon the floats, and *vice versa*.

The spawn to be hatched in this apparatus is prepared in the usual manner for artificial hatching. The cases should be carefully watched. They should be anchored in a current, for shad, but may be anchored in still water for certain other varieties of fish, and for frogs. As soon as the spawn is hatched the plate C is raised and the young shad pass out through the screen N. The case must only be opened after dark, for shad, as the smaller fish which would take the young shad only feed during the day. This gives the young shad an opportunity to take care of themselves as nature dictates.

The ends or sides, either or both, may be made of wire or cloth screens, with a bottom of the same, or it may be made close, but I prefer the construction principally shown and described. It will be seen that by this plan the spawn is all exposed to the circulation necessary, and is entirely relieved from all sediment or other obstructions or tendencies to prevent a perfect hatching.

What I claim as my invention, and desire to secure by Letters Patent, is—

The employment or use of the fish-propagator or spawn-hatcher, constructed and arranged substantially in the manner and for the purposes herein shown and described.

SETH GREEN.

Witnesses:
WM. S. LOUGHBOROUGH,
FRED. A. HATCH.